US009578508B2

(12) United States Patent
Duggan et al.

(10) Patent No.: US 9,578,508 B2
(45) Date of Patent: Feb. 21, 2017

(54) METHOD AND APPARATUS FOR WIRELESS DEVICE COUNTERMEASURES AGAINST MALICIOUS INFRASTRUCTURE

(71) Applicant: QUALCOMM Incorporated, San Diego, CA (US)

(72) Inventors: Matthew C. Duggan, Tokyo (JP); Michael William Paddon, Tokyo (JP); Kento Tarui, Tokyo (JP)

(73) Assignee: QUALCOMM INCORPORATED, Sen Diego, CA (US)

( * ) Notice: Subject to any disclaimer, the term of this patent is extended or adjusted under 35 U.S.C. 154(b) by 11 days.

(21) Appl. No.: 13/801,873

(22) Filed: Mar. 13, 2013

(65) Prior Publication Data
US 2014/0273949 A1    Sep. 18, 2014

(51) Int. Cl.
H04W 12/08    (2009.01)
H04W 12/12    (2009.01)
H04L 12/64    (2006.01)

(52) U.S. Cl.
CPC .......... H04W 12/08 (2013.01); H04L 12/6418 (2013.01)

(58) Field of Classification Search
CPC .......... H04W 12/00; G06F 21/00; G06F 21/43
USPC ......... 455/410, 411, 436–444; 370/252, 331, 370/332; 705/1; 726/25
See application file for complete search history.

(56) References Cited

U.S. PATENT DOCUMENTS

| 7,920,558 | B2 | 4/2011 | He |
| 2005/0037733 | A1 | 2/2005 | Coleman et al. |
| 2006/0116898 | A1* | 6/2006 | Peterson .............. G06Q 40/025 705/38 |
| 2006/0259957 | A1* | 11/2006 | Tam ....................... G06F 21/10 726/3 |
| 2007/0079376 | A1 | 4/2007 | Robert et al. |
| 2007/0115899 | A1* | 5/2007 | Ovadia et al. ................ 370/338 |
| 2008/0039096 | A1* | 2/2008 | Forsberg .............. H04L 63/126 455/438 |
| 2010/0130209 | A1* | 5/2010 | Florkey ................ H04W 36/36 455/437 |
| 2011/0099361 | A1 | 4/2011 | Shah et al. |

(Continued)

FOREIGN PATENT DOCUMENTS

| EP | 2343667 A1 | 7/2011 |
| WO | 03090371 A1 | 10/2003 |

OTHER PUBLICATIONS

International Search Report and Written Opinion—PCT/US2014/022090—ISA/EPO—Aug. 4, 2014.

*Primary Examiner* — Kamran Afshar
*Assistant Examiner* — Farideh Madani
(74) *Attorney, Agent, or Firm* — Arent Fox LLP

(57) ABSTRACT

System, apparatus, and methods are provided for protecting against malicious infrastructure in a wireless communication network. A system determines a trust metric for an access point and decides to avoid communication with the access point based on the trust metric for the access point. The trust metric may, for example, be a numeric value such as a probability of trustworthiness or a categorization of trustworthiness. The system may determine the trust metric by receiving a list of access points and their corresponding trust metrics and matching a potential access point to its listed trust metric. The system may try to avoid using an untrustworthy access point's services unless it deems the services important enough to risk the communication.

36 Claims, 9 Drawing Sheets

(56) References Cited

U.S. PATENT DOCUMENTS

| | | | |
|---|---|---|---|
| 2011/0151833 A1* | 6/2011 | Snider | B60R 25/1025 |
| | | | 455/410 |
| 2011/0265153 A1 | 10/2011 | Guccione et al. | |
| 2011/0317576 A1* | 12/2011 | Nguyen | H04W 36/0083 |
| | | | 370/252 |
| 2013/0031213 A1 | 1/2013 | Nissennboim | |
| 2013/0097710 A1* | 4/2013 | Basavapatna | H04W 4/02 |
| | | | 726/25 |

* cited by examiner

METHOD AND APPARATUS FOR WIRELESS DEVICE COUNTERMEASURES AGAINST MALICIOUS INFRASTRUCTURE

BACKGROUND

I. Field

The present disclosure relates to communication systems and to techniques for protecting against malicious infrastructure in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, etc. A femtocell may be referred to as a small cell herein.

Current LTE design generally assumes that the network side is trustworthy. Macro cell towers are typically located inside secure buildings. Femtocells, however, may be bought and operated by individuals in their own homes. A malicious actor may install an authentic femtocell then modify it to perform traffic interception or denial of service attacks against user equipment in range. The malicious actor may alternatively extract cryptographic keys from authentic femtocells to impersonate legitimate infrastructure.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for protecting against malicious infrastructure in a wireless communication network. In an example embodiment, a system determines a trust metric for an access point and decides to avoid communication with the access point based on the trust metric for the access point.

DETAILED DESCRIPTION

Techniques for interference management in a wireless communication system are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink (DL) and SC-FDMA on the uplink (UL). UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are explained in the exemplary context of 3GPP networks, and more particularly in the context of the interference management for such networks. The word "exemplary" is used herein to mean "serving as an example, instance, or illustration." Any embodiment described herein as "exemplary" is not necessarily to be construed as preferred or advantageous over other embodiments.

Figure 1:
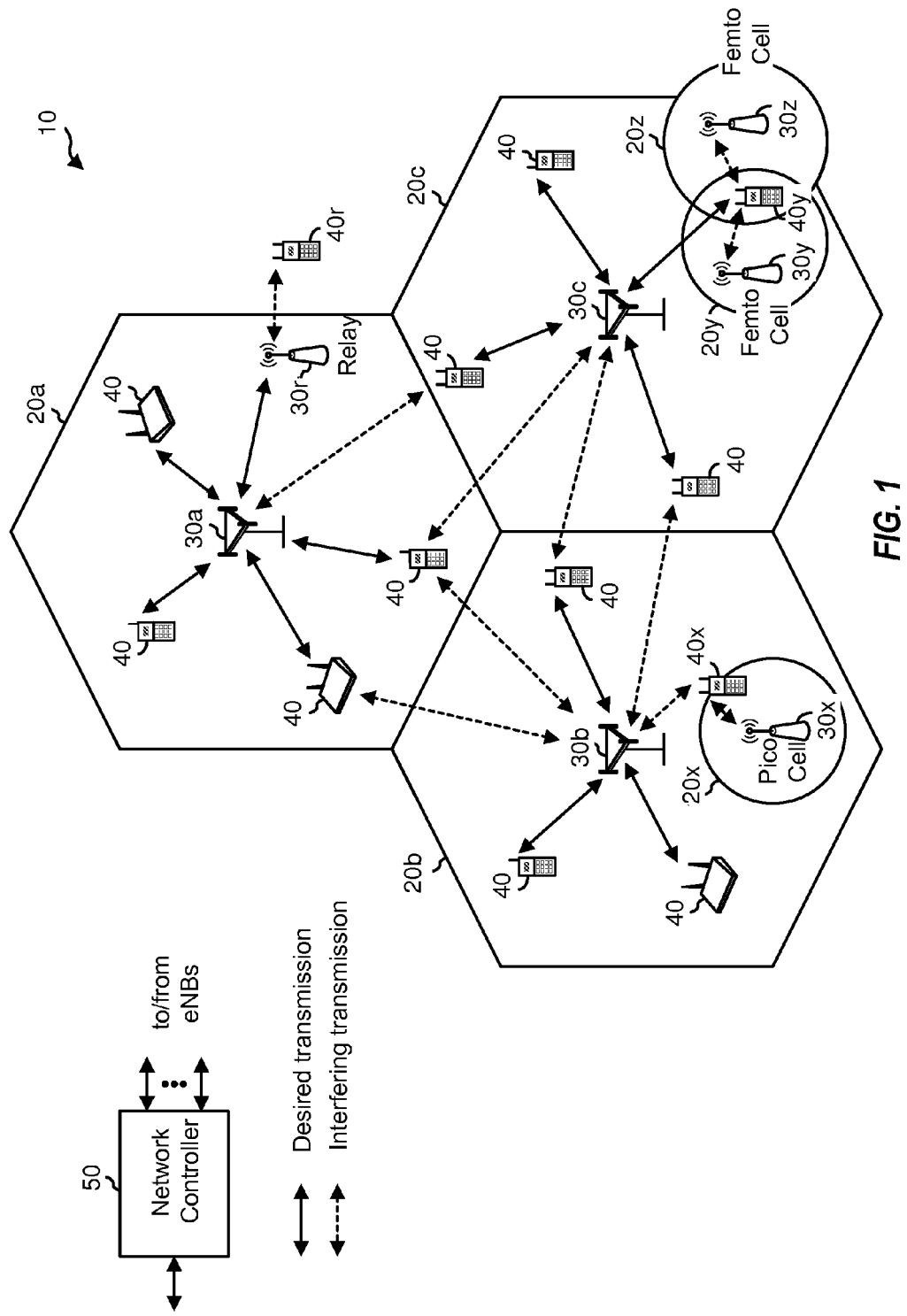
FIG. 1 is a block diagram conceptually illustrating an example of a telecommunications system.

FIG. 1 shows a wireless communication network 10, which may be an LTE network or some other wireless network (e.g., a 3G network or the like). Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a picocell, a femtocell, and/or other types of cell. A macro cell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG), or closed access). In the example shown in FIG. 1, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a picocell 20d. An eNB 30e may be a femto eNB or femto access point (FAP) for a femtocell 20e.

Wireless network may also include relays 30r. A relay may be an entity that can receive a transmission of data from an upstream station (e.g., an eNB or a UE) and send a transmission of the data to a downstream station (e.g., a UE or an eNB). A relay may also be a UE that can relay transmission for other UEs.

A network controller 50 may couple to a set of eNBs and may provide coordination and control for these eNBs. Network controller 50 may include a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the DL and UL. A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the given DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas)

and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
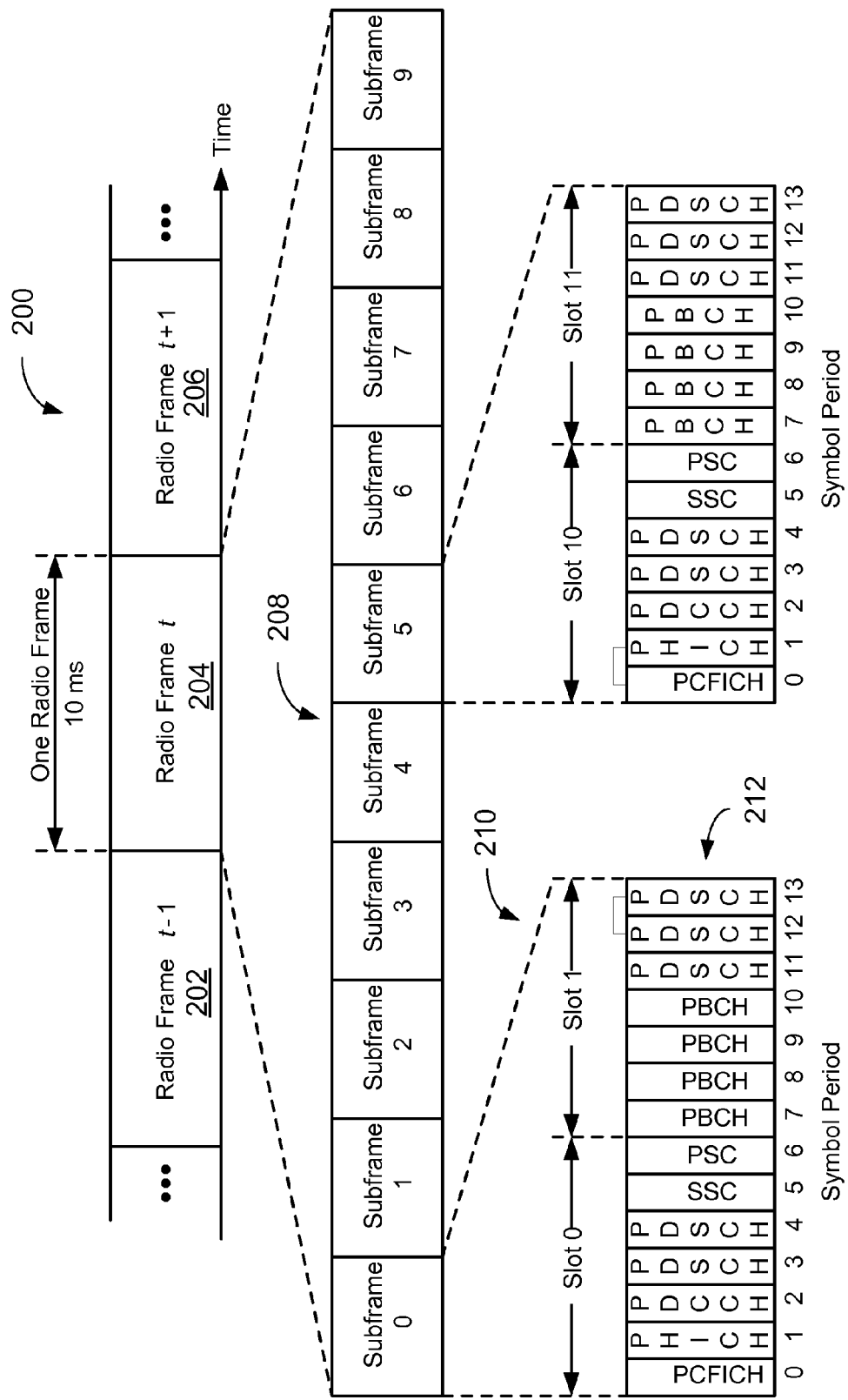
FIG. 2 is a block diagram conceptually illustrating an example of a down link frame structure in a telecommunications system.
Figure 6:
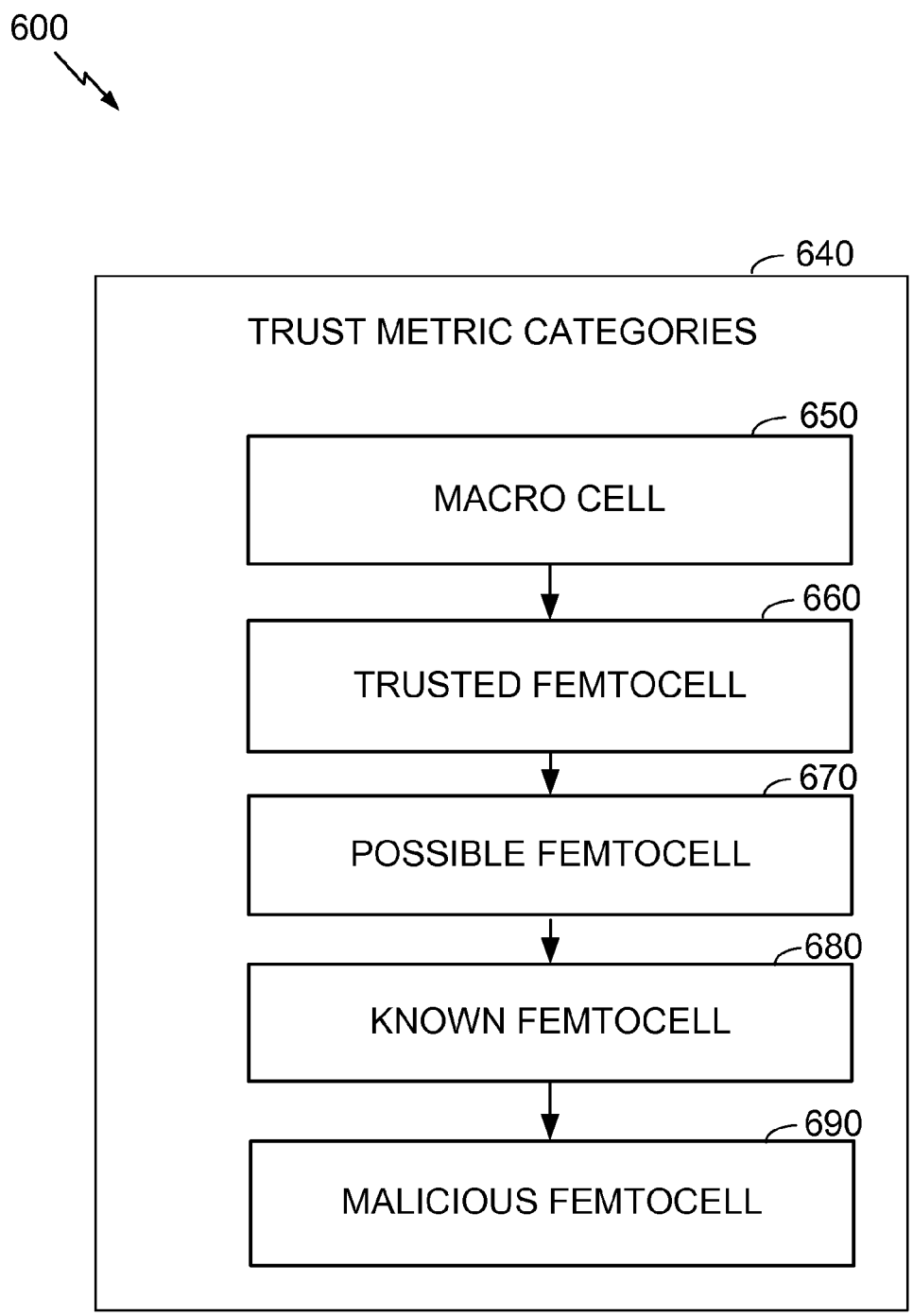
FIG. 6 illustrates aspects of an example system for protecting against malicious infrastructure in a wireless communication network.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
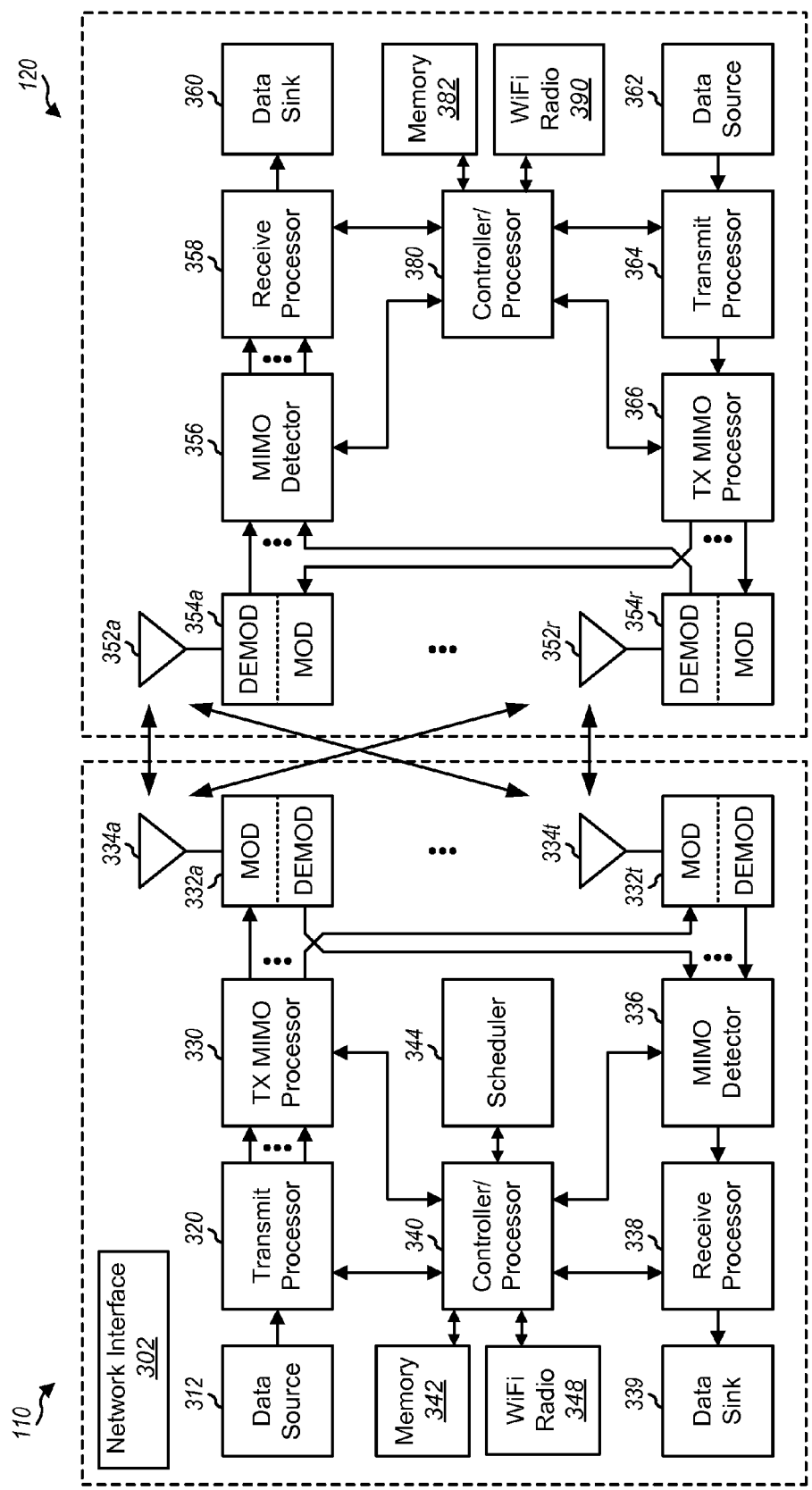
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 30c in FIG. 1, and the UE 120 may be the UE 40y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4, 6, 7, and 9, and/or other processes for the techniques described herein. The memories 342 and 382 may store data and program codes for the base station 110 and the UE 120, respectively. A scheduler 344 may schedule UEs for data transmission on the downlink and/or uplink.

In related aspects, the base station 110 may include a radio component 348 (e.g., a WiFi radio component/module or the like) that is co-located with the components 312-344, wherein the base station 110 may use the component 348 to communicate via a first radio technology (e.g., WiFi), and may use ones of the other co-located components to communicate via a second radio technology (e.g., 3G CDMA, 4G LTE, or the like, or combinations thereof). Similarly, the UE 120 may include a radio component 390 (e.g., a WiFi radio component/module or the like) that is co-located with the components 352-382, wherein the UE may use the component 390 to communicate via the first radio technology, and may use ones of the other co-located components to communicate via the second radio technology. In further related aspects, the base station 110 may also include a network interface 302 for connecting to one or more other base stations or core network entities via wired network(s).

Figure 4:
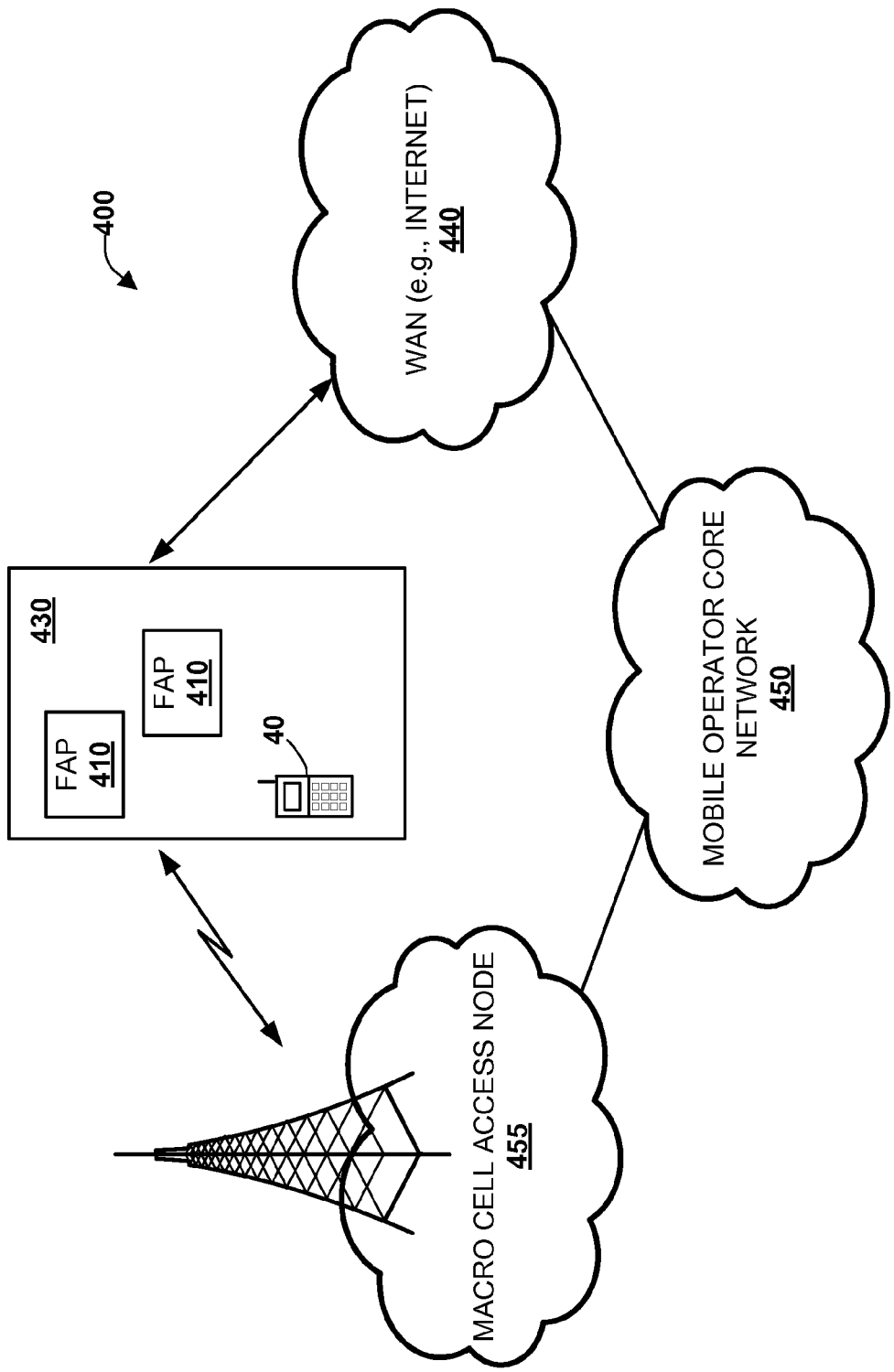
FIG. 4 is a block diagram illustrating another example communication system.

FIG. 4 is an illustration of a planned or semi-planned wireless communication environment 400, in accordance with various aspects. Communication environment 400 includes multiple access point base stations, including FAPs 410, each of which are installed in corresponding small scale network environments. Examples of small scale network environments can include user residences, places of business, indoor/outdoor facilities 430, and so forth. The FAPs 410 can be configured to serve associated UEs 40 (e.g., included in a CSG associated with FAPs 410), or optionally alien or visitor UEs 40 (e.g., UEs that are not configured for the CSG of the FAP 410). Each FAP 410 is further coupled to a wide area network (WAN) (e.g., the Internet 440) and a mobile operator core network 450 via a DSL router, a cable modem, a broadband over power line connection, a satellite Internet connection, or the like.

To implement wireless services via FAPs 410, an owner of the FAPs 410 subscribes to mobile service offered through the mobile operator core network 450. Also, the UE 40 can be capable to operate in a macro cellular environment and/or in a residential small scale network environment, utilizing various techniques described herein. Thus, at least in some disclosed aspects, FAP 410 can be backward compatible with any suitable existing UE 40. Furthermore, in addition to the macro cell mobile network 455, UE 40 is served by a predetermined number of FAPs 410, specifically FAPs 410 that reside within a corresponding user residence(s), place(s) of business, or indoor/outdoor facilities 430, and cannot be in a soft handover state with the macro cell mobile network 455 of the mobile operator core network 450. It should be appreciated that although aspects described herein employ 3GPP terminology, it is to be understood that the aspects can also be applied to various technologies, including 3GPP technology (Release 99 [Rel99], Rel5, Rel6, Rel7), 3GPP2 technology (1×RTT, 1×EV-DO Rel0, RevA, RevB), and other known and related technologies.

As discussed above, an eNB may provide communication coverage for a macro cell, a picocell, a femtocell, and/or other types of cell. Capacity offload gains of a femtocell network are maximized when femtocells are deployed on a dedicated carrier, and thus, there is no interference from a macro network on the same channel as the deployed femtocells. However, because bandwidth is such a scarce resource, bandwidth needs to be allocated and managed with great care and efficiency. Accordingly, an operator may decide if and/or when to dedicate a carrier to femtocells to maximize the capacity of the network.

In accordance with one or more embodiments of the present disclosure, there are provided techniques for protecting against malicious infrastructure in a wireless communication network. Current LTE design generally assumes that the network side is trustworthy. Macro cell towers are typically located inside secure buildings. Femtocells, however, may be bought and operated by individuals in their own homes. A malicious actor may install an authentic femtocell then modify it to perform traffic interception or denial of service attacks against user equipment in range. The malicious actor may alternatively extract cryptographic keys from authentic femtocells to impersonate legitimate infrastructure. The invention proposes determining a trust metric (trustworthiness rating) for each access point (macrocell or femtocell) that may potentially serve an access terminal (mobile device or UE). The access terminal may then try to avoid communicating with a particular access point based on the particular access point's trust metric (e.g. below a threshold).

Figure 5:
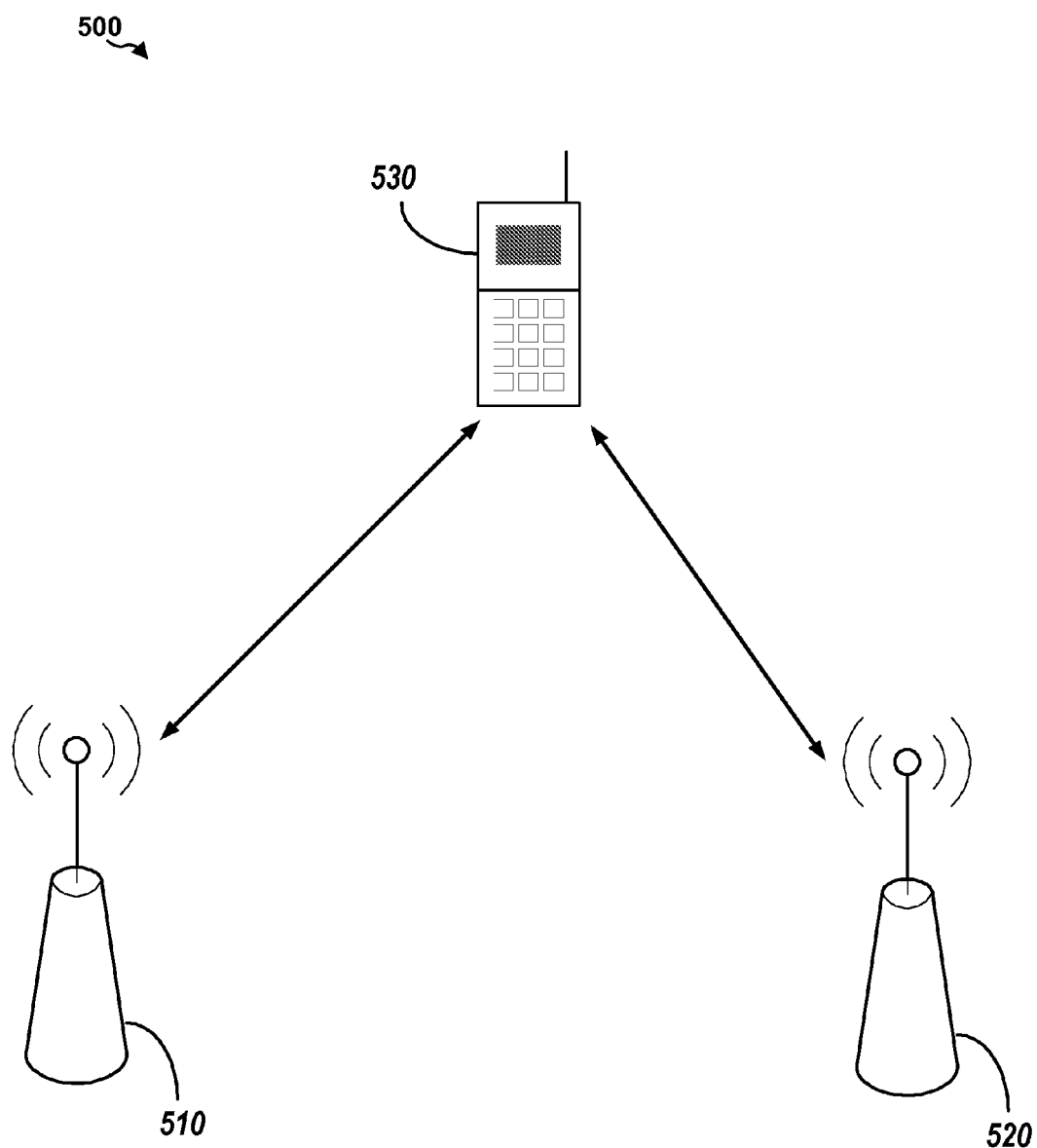
FIG. 5 illustrates aspects of an example technique for protecting against malicious infrastructure in a wireless communication network.

FIG. 5 illustrates aspects of an example system 500 for protecting against malicious infrastructure in a wireless communication network. A UE 530 may be served by an access point 510. The UE 350 may also be able to communicate with a second access point 520, which is also a candidate for a handover target. For example, if the UE 530 moves into towards the second access point 520, it may be required to handover to the second access point 520 from the first access point 510. Each access point (510 or 520) may be trustworthy or may be malicious.

In an example embodiment, the UE 530 may determine a trust metric for the access point 520. The trust metric may be represented by a numerical value representing a probability of trustworthiness of the UE. The trust metric may also be represented by placing the UE 520 in to one of a plurality of trust categories where determining the trust metric for the access point 520 involves categorizing the access point from a plurality of trust categories.

FIG. 6 illustrates aspects of an example technique 600 for protecting against malicious infrastructure in a wireless communication network. For example, the plurality of trust categories 640 may include a macro cell category 650, a trusted femtocell category 660, a possible femtocell category 670, a known femtocell category 680, and a known malicious cell category 690. The categories may be ranked from the most trustworthy (macro cell category 650) to the least trustworthy (malicious femtocell 690).

In an example embodiment, determining the trust metric for the access point is based on determining whether the access point is a femtocell. In related aspects, determining the trust metric may involve receiving a characteristic data for the access point from an UE and determining the trust metric for the access point 510 based on the characteristic data. The UE 630 may determine that the access point 510 is a femtocell or not based on characteristic data such as signal strength. In related aspects, the characteristic data may be received directly from the corresponding access point. In other related aspects, the characteristic data may be shared by and received from other network nodes (e.g. other UE or other access points).

In an example embodiment, the trust metric for the access point may be determined by receiving a trust metric list comprising a plurality of access point IDs and corresponding trust metrics. Crowed-sourced information for signal strength or other access point characteristic data can be used, for example, to identify whether an access point is a femtocell (and therefore less trustworthy) or a macro cell.

The UE 530 may decide to avoid communication with the access point 510 based on the trust metric for the access point 510. In related aspects, the decision to avoid communication may be further based on an assessed importance for communicating with the access point 510. The UE may try to avoid using an untrustworthy access point's services unless it deems the services important enough to risk the communication. The UE 530 may assess the importance versus risk for a particular communication. For example, when only an untrustworthy access point is available, connecting a phone call may be deemed important enough, while routine application access (e.g. social networking updates) may be deemed unimportant. However, when using a trustworthy access point, all communication may be deemed important enough.

In an example embodiment, the UE 530 may defer communication with the access point, based on the trust metric for the access point. For example, the communication may be deferred until the UE 530 is once again served by a trustworthy access point. In a related aspect, the UE 530 may request a user decision whether to communicate with the access point, based on the trust metric for the access point. For example, the user may be presented with a dialog box asking the user to decide whether to pick up a call while being served by an untrustworthy access point.

Figure 7:
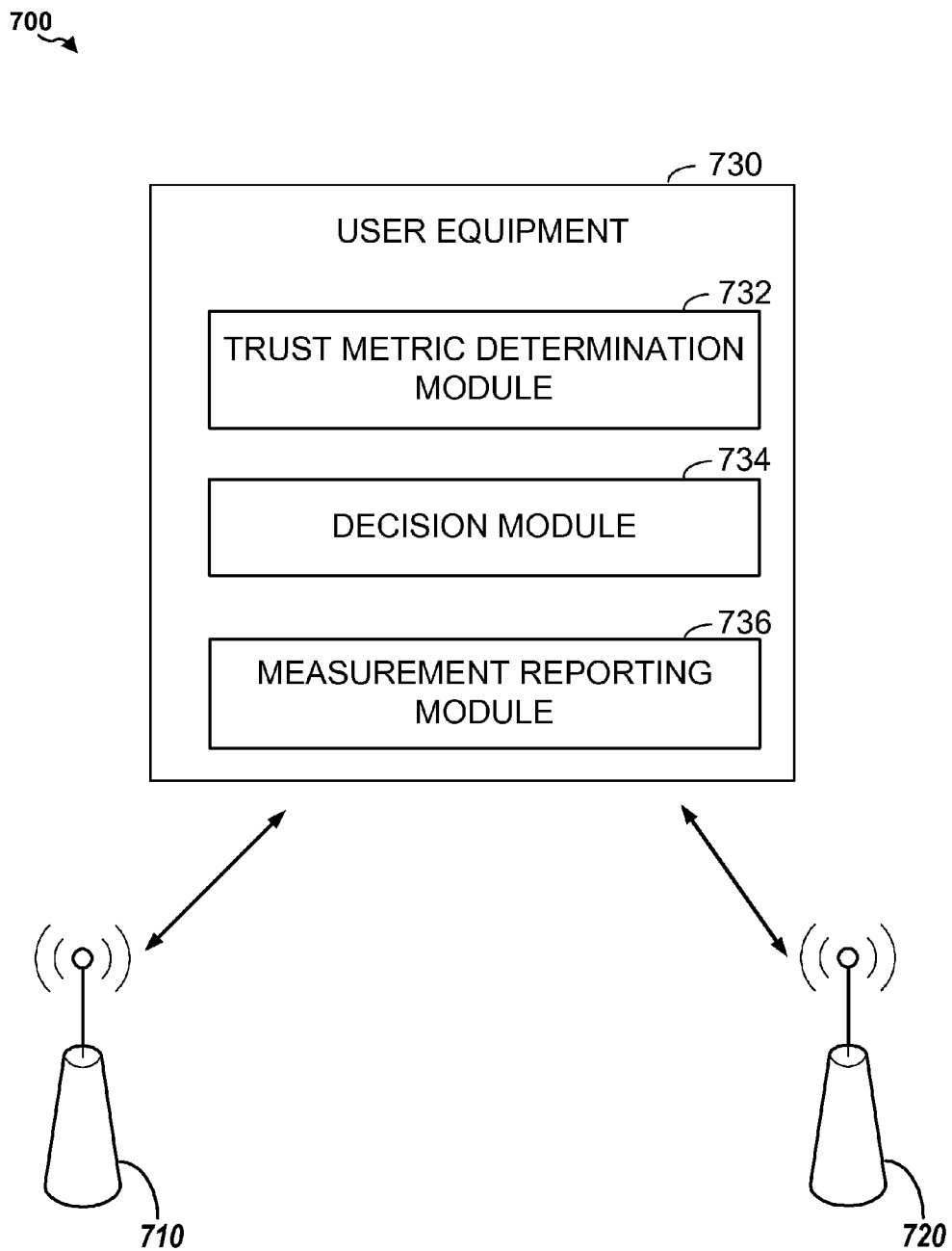
FIG. 7 illustrates aspects of an example system for protecting against malicious infrastructure in a wireless communication network.

FIG. 7 illustrates aspects of an example system for protecting against malicious infrastructure in a wireless communication network. In an example embodiment, a trust metric determination module 732 determines the trust metric for access point 710. A decision module 734 determines whether to avoid communication with the access point 710 based on the trust metric.

In an example embodiment, the UE 730 may modify, by a measurement reporting module 736, a measurement report based on the trust metric for the access point, 710 wherein the measurement report modification alters a probability of handing over to or away from the access point 710. In related aspects, modifying the measurement report is further based on a trust metric for a second access point.

For example, the UE 730 may lower the measurement report of a signal strength of the access point 710 to increase the probability of handing over to a second access point 720 (if currently served by the access point 710) or to decrease the probability of handing over from the second access point 720 (if currently served by the second access point 720).

Alternatively, The UE 730 may increase the measurement report of a signal strength of the access point 710 to decrease the probability of handing over to a second access point 720 (if currently served by the access point 710) or to increase the probability of handing over from the second access point 720 (if currently served by the second access point 720).

In an example embodiment, the UE 730 may avoid handovers to an untrustworthy access point by ignoring handover commands to handover to the untrustworthy access point. A UE 730 that just ignores the command will be treated by the network as if the negotiation with the target cell failed.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
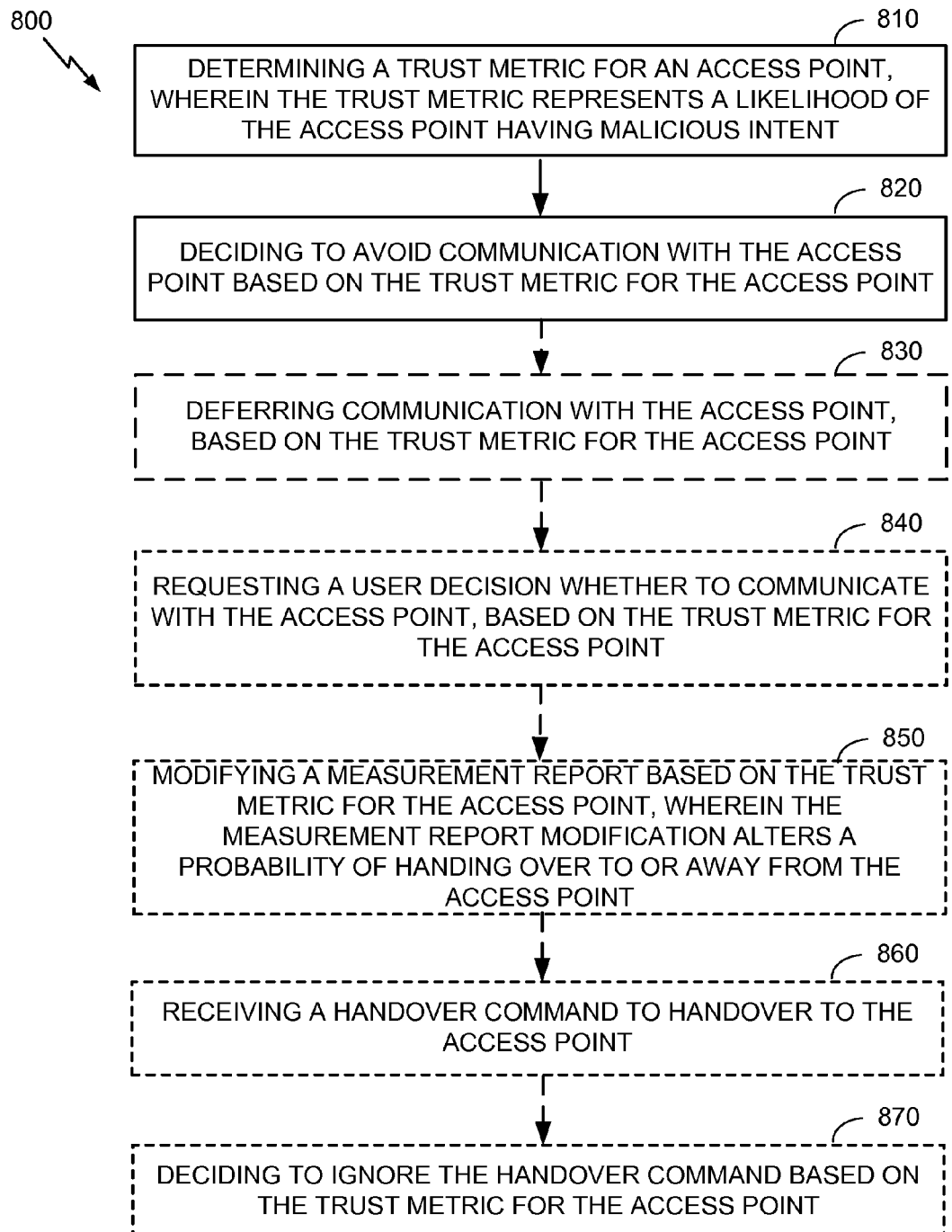
FIG. 8 shows an example methodology for protecting against malicious infrastructure in a wireless communication network.

In accordance with one or more aspects of the embodiments described herein, with reference to FIG. 8, there is shown an example methodology 800 for protecting against malicious infrastructure in a wireless communication network. Specifically, method 800 describes a procedure to avoid service from untrustworthy access points. The method 800 may involve, at 810, determining a trust metric for an access point, where the trust metric represents a likelihood of the access point having malicious intent.

The method 800 may involve, at 820, deciding to avoid communication with the access point based on the trust metric for the access point.

In related aspects, determining the trust metric for the access point may be based on determining whether the access point is a femtocell. Determining the trust metric for the access point may comprise categorizing the access point from a plurality of trust categories. The plurality of trust categories may comprise at least one of a macro cell category, a trusted femtocell category, a possible femtocell category, a known femtocell category, and a known malicious cell category. The plurality of trust categories may comprise at least one of a macro cell category, a trusted femtocell category, a possible femtocell category, a known femtocell category, and a known malicious cell category. The trust metric for the access point may comprise a numerical value representing a probability of trustworthiness of the access point.

In related aspects, determining the trust metric for the access point may comprise receiving a trust metric list comprising a plurality of access point IDs and corresponding trust metrics. Determining the trust metric for the access point may comprise receiving a characteristic data for the access point and determining the trust metric for the access point based on the characteristic data. The characteristic data may comprise signal strength. The deciding to avoid communication may be further based on an assessed importance for communicating with the access point.

With continued reference to FIG. 8, there are also shown further operations or aspects that are optional and may be performed by the network entity or component(s) thereof. The method 800 may terminate after any of the shown blocks without necessarily having to include any subsequent downstream block(s) that may be illustrated. It is further noted that numbers of the blocks do not imply a particular order in which the blocks may be performed according to the method 800.

The method 800 may optionally involve, at 830, deferring communication with the access point, based on the trust metric for the access point. The method 800 may optionally involve, at 840, requesting a user decision whether to communicate with the access point, based on the trust metric for the access point. The method 800 may optionally involve, at 850, modifying a measurement report based on the trust metric for the access point, where the measurement report modification alters a probability of handing over to or away from the access point. Modifying the measurement report may be further based on a trust metric for a second access point. Modifying the measurement report may comprise lowering the measurement report of a signal strength of the access point to increase the probability of handing over to a second access point or to decrease the probability of handing over from the second access point. Modifying the measurement report may comprise increasing the measurement report of a signal strength of the access point to decrease the probability of handing over to a second access point or to increase the probability of handing over from the second access point. The method 800 may optionally involve, at 860, receiving a handover command to handover to the access point. The method 870 may optionally involve, at 870, deciding to ignore the handover command based on the trust metric for the access point.

Figure 9:
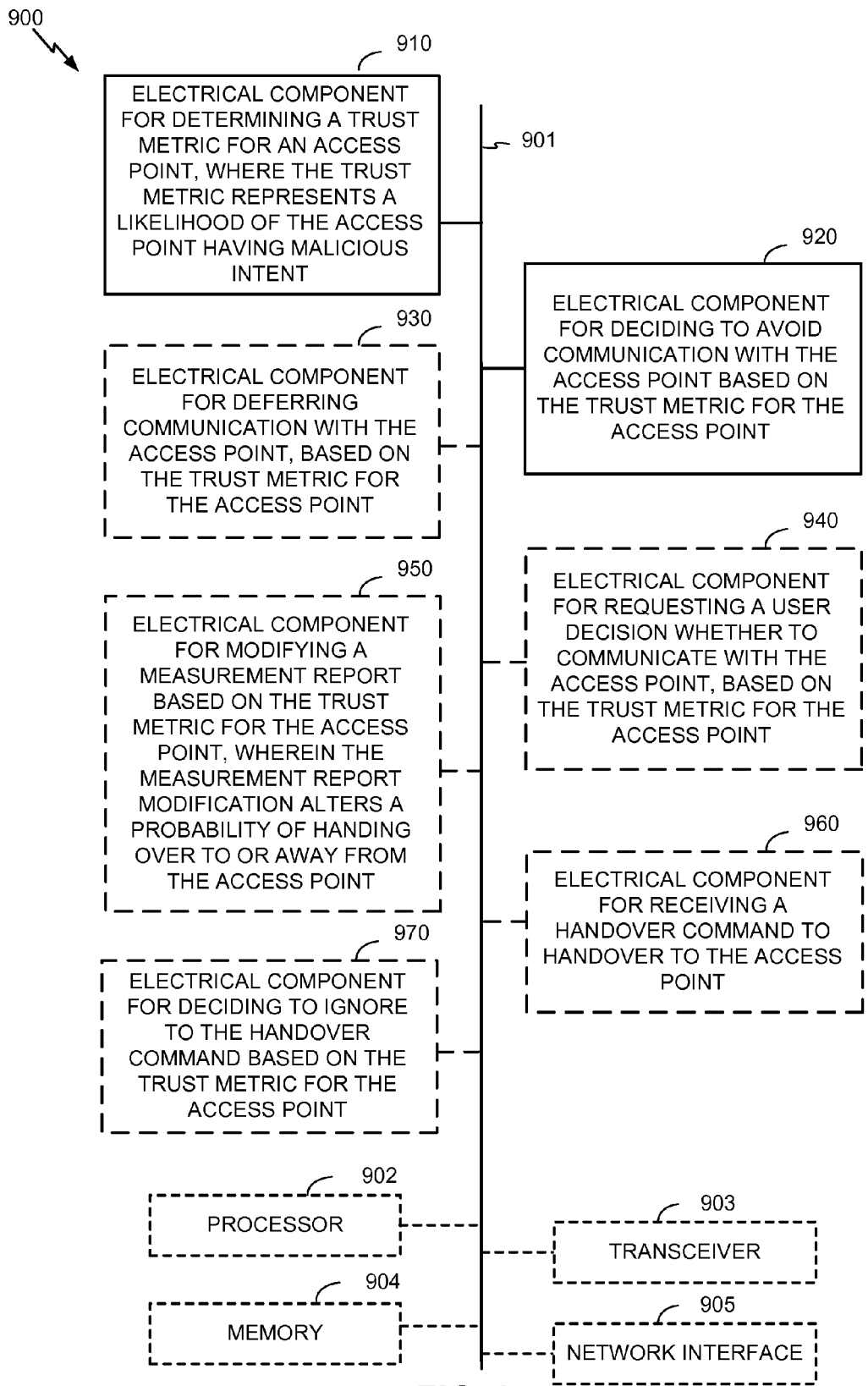
FIG. 9 is a block diagram of an example system for protecting against malicious infrastructure in a wireless communication network.

In accordance with one or more aspects of the embodiments described herein, FIG. 9 is a block diagram of an example system for protecting against malicious infrastructure in a wireless communication network. The exemplary apparatus 900 may be configured as a computing device or as a processor or similar device/component for use within. In one example, the apparatus 900 may include functional blocks that can represent functions implemented by a processor, software, or combination thereof (e.g., firmware). In another example, the apparatus 300 may be a system on a chip (SoC) or similar integrated circuit (IC).

In one embodiment, apparatus 900 may include an electrical component or module 910 for determining a trust metric for an access point, where the trust metric represents a likelihood of the access point having malicious intent.

The apparatus 900 may include an electrical component 920 for deciding to avoid communication with the access point based on the trust metric for the access point.

The apparatus 900 may optionally include an electrical component 930 for deferring communication with the access point, based on the trust metric for the access point.

The apparatus 900 may optionally include an electrical component 940 for requesting a user decision whether to communicate with the access point, based on the trust metric for the access point.

The apparatus 900 may optionally include an electrical component 950 for modifying a measurement report based on the trust metric for the access point, wherein the measurement report modification alters a probability of handing over to or away from the access point.

The apparatus 900 may optionally include an electrical component 960 for receiving a handover command to handover to the access point.

The apparatus 900 may optionally include an electrical component 970 for deciding to ignore to the handover command based on the trust metric for the access point.

In further related aspects, the apparatus 900 may optionally include a processor component 902. The processor 902 may be in operative communication with the components 910-970 via a bus 901 or similar communication coupling. The processor 902 may effect initiation and scheduling of the processes or functions performed by electrical components 910-970.

In yet further related aspects, the apparatus 900 may include a radio transceiver component 903. A standalone receiver and/or standalone transmitter may be used in lieu of or in conjunction with the transceiver 903. The apparatus 900 may also include a network interface 905 for connecting to one or more other communication devices or the like. The apparatus 900 may optionally include a component for storing information, such as, for example, a memory device/component 904. The computer readable medium or the memory component 904 may be operatively coupled to the other components of the apparatus 900 via the bus 901 or the like. The memory component 904 may be adapted to store computer readable instructions and data for affecting the processes and behavior of the components 910-970, and subcomponents thereof, or the processor 902, or the methods disclosed herein. The memory component 904 may retain instructions for executing functions associated with the components 910-970. While shown as being external to the memory 904, it is to be understood that the components 910-970 can exist within the memory 904. It is further noted that the components in FIG. 9 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of protecting against malicious infrastructure in a wireless communication network, operable by an access terminal, comprising:
   determining a trust metric for an access point;
   assessing an importance level for a communication; and
   establishing the communication with the access point based on the trust metric determined for the access point and the importance level assessed for the communication, wherein the establishing the communication with the access point based on the trust metric and the importance level comprises establishing the communication with the access point when the trust metric indicates that the access point is untrustworthy and the importance level assessed for the communication is above a threshold.

2. The method of claim 1, wherein determining the trust metric for the access point comprises determining whether the access point is a femtocell.

3. The method of claim 1, wherein determining the trust metric for the access point comprises categorizing the access point from a plurality of trust categories.

4. The method of claim 3, wherein the plurality of trust categories comprise at least one of a macro cell category, a trusted femtocell category, a possible femtocell category, a known femtocell category, and a known malicious cell category.

5. The method of claim 1, wherein the trust metric for the access point comprises a numerical probability of the access point having malicious intent.

6. The method of claim 1, wherein determining the trust metric for the access point comprises receiving a trust metric list comprising a plurality of access point IDs and corresponding trust metrics.

7. The method of claim 1, wherein determining the trust metric for the access point comprises:
receiving characteristic data for the access point; and
determining the trust metric for the access point based on the characteristic data.

8. The method of claim 7, wherein the characteristic data comprises signal strength.

9. The method of claim 1, further comprising deferring communication with the access point, based on the trust metric for the access point.

10. The method of claim 1, further comprising requesting a user decision whether to communicate with the access point, based on the trust metric for the access point.

11. The method of claim 1, further comprising modifying a measurement report based on the trust metric for the access point, wherein the measurement report modification alters a probability of handing over to or away from the access point.

12. The method of claim 11, wherein modifying the measurement report is further based on the trust metric for a second access point.

13. The method of claim 11, wherein modifying the measurement report comprises lowering the measurement report of a signal strength of the access point to increase the probability of handing over to a second access point or to decrease the probability of handing over from the second access point.

14. The method of claim 11, wherein modifying the measurement report comprises increasing the measurement report of a signal strength of the access point to decrease the probability of handing over to a second access point or to increase the probability of handing over from the second access point.

15. The method of claim 1, further comprising:
receiving a handover command to handover to the access point; and
deciding to ignore the handover command based on the trust metric for the access point.

16. A wireless communication apparatus, comprising:
at least one processor configured to:
determine a trust metric for an access point;
assess an importance level for a communication; and
establish the communication with the access point based on the trust metric determined for the access point and the importance level assessed for the communication, wherein, to establish the communication with the access point based on the trust metric and the importance level, the at least one processor is configured to establish the communication with the access point when the trust metric indicates that the access point is untrustworthy and the importance level assessed for the communication is above a threshold; and
a memory coupled to the at least one processor for storing data.

17. The apparatus of claim 16, wherein determining the trust metric for the access point comprises categorizing the access point from a plurality of trust categories.

18. The apparatus of claim 16, wherein the trust metric for the access point comprises a numerical value representing a probability of trustworthiness of the access point.

19. The apparatus of claim 16, wherein determining the trust metric for the access point comprises receiving a trust metric list comprising a plurality of access point IDs and corresponding trust metrics.

20. The apparatus of claim 16, wherein determining the trust metric for the access point comprises:
receiving a characteristic data for the access point; and
determining the trust metric for the access point based on the characteristic data.

21. The apparatus of claim 16, wherein the processor is further configured to modify a measurement report based on the trust metric for the access point, wherein the measurement report modification alters a probability of handing over to or away from the access point.

22. The apparatus of claim 16, wherein the processor is further configured to:
receive a handover command to handover to the access point; and
decide to ignore the handover command based on the trust metric for the access point.

23. A wireless communication apparatus, comprising:
means for determining a trust metric for an access point; and
means for assessing an importance level for a communication; and
means for establishing the communication with the access point based on the trust metric determined for the access point and the level importance assessed for the communication, wherein the means for establishing the communication with the access point based on the trust metric and the importance level is configured to establish the communication with the access point when the trust metric indicates that the access point is untrustworthy and the importance level assessed for the communication is above a threshold.

24. The apparatus of claim 23, wherein determining the trust metric for the access point comprises categorizing the access point from a plurality of trust categories.

25. The apparatus of claim 23, wherein the trust metric for the access point comprises a numerical value representing a probability of trustworthiness of the access point.

26. The apparatus of claim 23, wherein determining the trust metric for the access point comprises receiving a trust metric list comprising a plurality of access point IDs and corresponding trust metrics.

27. The apparatus of claim 23, wherein the means for determining the trust metric for the access point is configured to:
receive a characteristic data for the access point; and
determine the trust metric for the access point based on the characteristic data.

28. The apparatus of claim 23, further comprising means for modifying a measurement report based on the trust metric for the access point, wherein the measurement report modification alters a probability of handing over to or away from the access point.

29. The apparatus of claim 23, further comprising:
means for receiving a handover command to handover to the access point; and
means for deciding to ignore the handover command based on the trust metric for the access point.

30. A non-transitory computer-readable medium storing computer executable code, comprising code to:
determine a trust metric for an access point; and
assess an importance level for a communication; and
establish the communication with the access point based on the trust metric determined for the access point and the importance level assessed for the communication, wherein the establishing the communication with the access point based on the trust metric and the importance level comprises establishing the communication with the access point when the trust metric indicates that the access point is untrustworthy and the importance level assessed for the communication is above a threshold.

31. The non-transitory computer-readable medium of claim 30, wherein determining the trust metric for the access point comprises categorizing the access point from a plurality of trust categories.

32. The non-transitory computer-readable medium of claim 30, wherein the trust metric for the access point comprises a numerical value representing a probability of trustworthiness of the access point.

33. The non-transitory computer-readable medium of claim 30, wherein determining the trust metric for the access point comprises receiving a trust metric list comprising a plurality of access point IDs and corresponding trust metrics.

34. The non-transitory computer-readable medium of claim 30, wherein determining the trust metric for the access point comprises:

receiving a characteristic data for the access point; and determining the trust metric for the access point based on the characteristic data.

35. The non-transitory computer-readable medium of claim 30, further comprising code to modify a measurement report based on the trust metric for the access point, wherein the measurement report modification alters a probability of handing over to or away from the access point.

36. The non-transitory computer-readable medium of claim 30, further comprising code to:

receive a handover command to handover to the access point; and decide to ignore the handover command based on the trust metric for the access point.

* * * * *